March 9, 1965   J. J. PRIAPI   3,172,255
IGNITION DEVICE
Filed Sept. 26, 1961
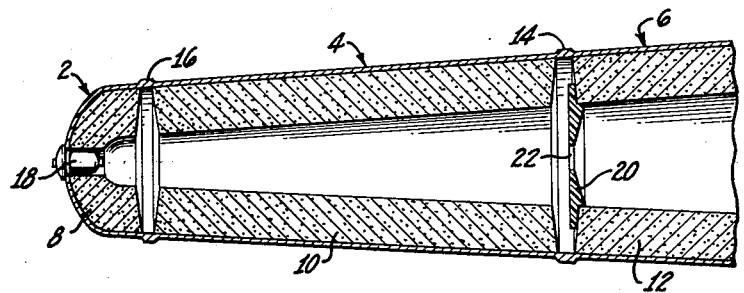
INVENTOR:
JOSEPH J. PRIAPI
BY
ATTORNEYS 3,172,255
IGNITION DEVICE
Joseph J. Priapi, San Jose, Calif., assignor to United Aircraft Corporation, a corporation of Delaware
Filed Sept. 26, 1961, Ser. No. 140,755
1 Claim. (Cl. 60—35.6)

This invention relates to an ignition device and more particularly relates to an ignition device for a solid propellant rocket engine wherein the propellant grain comprises a plurality of segments.

Heretofore it has been necessary to design an ignition system for each solid propellant rocket developed. The ignition system must be correlated with the size of the rocket engine since if the ignition system is too small the propellant will not be uniformly ignited while if it is too large, over ignition as well as excessive chamber pressures may result. The size of the motor dictates the size of the port volume and of the nozzle throat area and these factors must be taken into consideration in the designs of the igniter. Ordinarily this causes no particular problem since such rocket engines are developed in a particular size and the igniter is designed for the particular engine. However, when one attempts to apply an igniter to segmented motors wherein a plurality of segments are united to make the finished motor, problems arise since it is not known in advance the exact number of segments which will be combined in the finished motor. Further, for greater effectiveness, such segmented motors should be tapered which means that the forward section is quite often small in comparison with the forward part of motors of comparable size. Thus, when a large number of segments are combined, the forward segment may be of insufficient size to accommodate an igniter designed for efficient operation with the overall engine.

In accordance with the present invention, a universal ignition device is provided for large segmented engines wherein the igniter can be used without modifications for engines of any conceivable size.

It is therefore an object of the present invention to provide an ignition system which will produce satisfactory ignition in a solid propellant rocket engine containing any number of segments.

Another object of this invention is to provide an ignition system for solid propellant rocket engines wherein a relatively small igniter will suffice to ignite a relatively large engine.

Generally speaking, the objects of the present invention are carried out by providing a diaphragm within the engine, which diaphragm has an opening or openings therein which correspond in size to the throat area which would normally be associated with an engine of the size represented by that portion of the engine forward of the diaphragm. The diaphragm is made of a material which burns or erodes under engine operating conditions.

In the drawing forming a part of this application, the single figure is a partial sectional view of a rocket engine embodying the present invention.

Referring now to the drawing by reference characters, there is shown a rocket engine having a head generally designated 2, a first tapered section generally designated 4 and a second tapered section 6. Each of the segments described has a propellant grain therein designated 8, 10 and 12, respectively. There is thus formed an elongated port, extending from one segment to the next. The tapered segments 4 and 6 are joined by means 14 and means not illustrated in detail since it forms no part of the present invention. The head 2 and the first tapered segment 4 may also be joined as at 16 although the head and the first tapered segment may be formed as a single piece.

Mounted in the head 2 is a conventional ignition device 18. The ignition device 18 is designed for firing a rocket engine of the size represented by the segments 2 and 4 and would normally be inadequate for firing a rocket engine which also embraced the segment 6 or any additional segments. It will be understood, of course, that the head 2 and the first tapered segment 4 could be used as a rocket engine by themselves in which case a nozzle assembly would be fitted at the aft end of the segment 4 and the ignition device 18 would be adequate for the firing of such a rocket. Since the ignition device 18 is inadequate for firing a rocket containing at least a segment 6, a diaphragm 20 is provided between the segments 4 and 6, said diaphragm having an orifice 22 at the center thereof the orifice 22 corresponding in size with the throat area of the nozzle which would normally be attached to a rocket engine of the size embracing only the segments 2 and 4. The diaphragm 20 is made of a material which will burn or otherwise disintegrate under the heat and pressure conditions normal to rocket engines although the material is one which is somewhat resistant to burning such as honeycombed epoxy resin reinforced paper.

With the diaphragm 20 in place, upon the firing of the igniter, the segments 2 and 4 will experience the same ignition transients as if there were no subsequent segments forming part of the motor. When the forward segments are ignited the evolved hot propellant gases will be discharged through the orifice in the closure and ignite the remaining segments. The pressure in the motor will rise and the closure will be burned away and be completely consumed when normal motor operating pressure is attained.

Any igniter can be used in connection with the present invention but it is preferred to use a rocket type igniter in order to minimize the load placed upon the closure by the action of the igniter.

Only one diaphragm has been illustrated although it will be understood that several such diaphragms may be used on large engines.

Although the invention is primarily applicable to segmented engines, it may be applied to any engine wherein it is desired to ignite a large engine with a relatively small igniter. Further, the diaphragm was illustrated as being held between two segments since from a mechanical standpoint this is the most practical structure. However, the diaphragm may be placed at any point within the engine.

I claim:
In a solid propellant rocket engine having a plurality of tapered segments, each of said segments having an annular propellant grain therein whereby there is formed an elongated burning port extending from one segment to the next, a diaphragm separating at least two of the segments, said diaphragm having an orifice smaller than the diameter of the burning port and corresponding to the throat area which would normally be associated with an engine of the size represented by that portion of the engine forward of the diaphragm, said diaphragm being of a material which will disintegrate under the heat and pressure conditions normal to rocket engines and being of a material which is somewhat resistant to burning whereby backpressure causes rapid ignition of the segment immediately forward thereof, and an ignition device solely in one of the segments forward of the said diaphragm.

References Cited by the Examiner

UNITED STATES PATENTS

| 826,293 | 7/06 | Unge | 60—35.6 |
| 2,114,214 | 4/38 | Damblanc | 60—35.6 |
| 2,952,972 | 9/60 | Kimmel et al. | 60—35.6 |
| 3,031,842 | 5/62 | Ledwith | 60—35.6 |

FOREIGN PATENTS

| 570,211 | 6/45 | Great Britain. |

SAMUEL LEVINE, *Primary Examiner.*